Patented May 12, 1942

2,282,802

UNITED STATES PATENT OFFICE 2,282,802

TREATMENT OF COFFEE BEANS

Sidney Musher, New York, N. Y., assignor to Musher Foundation Incorporated, New York, N. Y., a corporation of New York No Drawing. Application April 23, 1940, Serial No. 331,182

5 Claims. (Cl. 99—152)

This application relates to retarding the development of staleness in roasted coffee beans and improving their keeping quality.

It has been found particularly difficult to retard staleness in roasted coffee because coffee is subject to very rapid oxidation. Moreover, many antioxidants which have been proposed for use in coffee are not acceptable either because of objections from a food standpoint or because of objectionable flavor imparted to the coffee.

It is therefore an object of the present invention to provide means for retarding the development of staleness in coffee in a simple and economical manner and at the same time in a manner which proves acceptable from a food standpoint.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with the present invention, there is applied to roasted coffee a relatively small amount of aqueous milk-solids-not-fat, preferably whey, and the coffee is subjected to a temperature in excess of 210° F. and desirably to over 250° F. incidental to or following the application of the milk solids.

The whey that is particularly utilized in accordance with the present invention is obtained from the manufacture of cheese and is the material drawn off after the milk has been curdled with rennet, for example, and after the curd has formed the proper degree of hardness. Of particular importance for use is the whey that is obtained from the manufacture of cottage cheese, whereby coagulation is effected by natural souring and the liquid has been heated nearly to boiling. The whey may further be treated in order to remove a portion of the lactose, the lactose being allowed to crystallize out.

The whey is substantially free of casein and of fat and will contain about 70% to 75% of lactose and 10% to 15% protein, the protein being substantially free of casein and being present in the form of milk albumin.

Where a portion of the lactose has been allowed to crystallize out, the whey will contain about 35% to 45% protein in the form of albumin and about 40% to 55% of lactose with approximately 13% to 17% total ash, based upon the solids weight of the whey.

Apparently in the production of the whey, antioxygenic action is materially enhanced and the whey is most desirably utilized in accordance with the present invention.

Moreover, it has been found of particular desirability to subject the whey to a temperature of at least about 200° F. and preferably to 235° F. to 245° F. for about 15 to 30 minutes or more at some stage in its processing whereby the whey is caramelized. The caramelization process further enhances the protective effect of the whey and unless the whey has been subjected to this caramelization step, the most desirable results of the present invention are not secured.

Although whey is preferred for use according to the present invention, other aqueous dispersions of milk solids may also be employed including particularly concentrated buttermilk where at least a portion of the lactose has been converted to lactic acid.

There may also be utilized such other milk-solids-not-fat as evaporated buttermilk containing about 25% to 30% total solids, condensed or semi solid buttermilk containing about 35% to 45% total solids, dried buttermilk rendered aqueous by dilution, skim milk in concentrated form, whole milk and whey residue.

As indicated above, these milk solids are preferably subjected to caramelization before being utilized in accordance with the present invention and they are desirably employed in concentrated or condensed form having between about 20% to 25% total solids.

The coffee beans are subjected to a direct flame treatment until the roasting operation has been completed and they are of the desired roasted color, aroma and flavor. The whey in aqueous dispersion or suspension is then applied to the hot roasted coffee beans by being sprayed on those beans in the roasting chamber and while the beans are at the high temperature of roasting.

Generally, the beans at this point are at a temperature of between 400° F. and 450° F. or more so that when the whey is applied in aqueous dispersion, the beans are suddenly reduced in temperature and no further roasting can take place.

There is applied to the roasted coffee beans a relatively small amount, under about 10%, of the whey or other milk solids on its solids weight basis. About 2% to 5% of the milk solids generally gives the desirable results of the present invention although larger proportions may also be employed.

Where partially concentrated or condensed whey or other milk solids are used, and where the whey is sufficiently dilute and free flowing to be applied directly to the coffee beans at the high temperature of roasting, no further dilution is required.

Where, however, powdered or highly concentrated whey, skim milk or other milk solids containing over about 60% total solids are employed for addition to the coffee beans at the roaster, the powdered or highly concentrated whey is first diluted in water so that the diluted whey suspension contains less than about 40% and desirably under 25% total solids. The diluted whey may then be sprayed on the coffee beans while they are at the high roasting temperature.

As a result of applying the whey or other milk solids to the coffee at this high roasting temperature, enhanced stabilization of the coffee takes place and even where the treated roasted coffee beans are then finely ground, retardation in the development of staleness of the ground coffee is observed.

For example, 500 pounds of coffee beans may be roasted until they reach a satisfactory color. There is then prepared an aqueous dispersion of whey comprising about 10 pounds of whey solids dispersed in about 40 pounds of water. This combination is then sprayed on the coffee beans in the roasting chamber, the application being made in the cylinder immediately as the flame is extinguished and while the beans are at the elevated temperature of roasting, substantially over 250° F.

At the time of application of the aqueous milk dispersion, it is estimated that about 60% to 70% or possibly more of the water which is applied to the roasted coffee beans is immediately converted to steam and only a small proportion remains in the roasted coffee beans.

The roasted coffee beans thus treated may be ground, extracted or otherwise processed and the coffee is substantially stabilized against deterioration and the development of staleness.

The aqueous milk solids dispersion may less preferably be applied to the coffee after the coffee beans have been ground, but where this is done, the coffee is either during the application or subsequently subjected to over about 200° F. and preferably to over 210° F. until the coffee is substantially dehydrated.

In any event, the coffee following treatment contains the complete original constituents of the ground roasted coffee in addition to the whey or other milk solids. After treatment, the coffee contains less than about 20% total moisture content and preferably less than 15%.

In addition to the enhanced stabilizing effect when the aqueous dispersion of milk solids is applied to the roasted coffee while the roasted coffee is at the roasting temperature, it has also been found that the milk-solids-not-fat tend to absorb some of the oil which is exuded at the surface of the coffee and thereby there is less oil formation on the coffee beans after grinding and during normal storage and distribution.

As a result of the treatment described in accordance with this invention, the roasted coffee is stabilized to a marked degree against staleness and the coffee has a finer flavor and aroma at the time of final consumption in the home.

The treated coffee beans show a slightly increased gloss at their surfaces but are otherwise not materially changed in appearance.

It is not desirable for the whey or the milk-solids-not-fat to be merely prepared in powdered form and mechanically mixed with the coffee beans or ground roasted coffee. The application of the whey or other milk solids is made in aqueous dispersion and following or during the application of the whey, the coffee is subjected to an elevated temperature in excess of 200° F. and preferably over 250° F. in order to produce the enhanced antioxygenic effect.

For example, ground roasted coffee may very desirably be dispersed in whey or other milk solids so that each individual particle of the coffee is surrounded by and intermingled with the milk solids. Under these circumstances there may be utilized as much as about 25% or more of whey solids to 75% of coffee solids. The combination, where desired, may then be heated and completely dried, preferably by the use of an elevated temperature treatment of over 200° F. and desirably over 250° F.

One part of ground roasted coffee may, for example, be dispersed in 1 to 3 parts of concentrated aqueous milk solids, preferably containing between 20% and 40% total solids. The combination may then be heated to at least 200° F. and preferably to 210° F. or more until completely dried.

In using whey or other milk solids, it is of particular importance to use the whey or other milk solids in substantially caramelized condition and after subjecting to a temperature of 235° F. to 245° F. for a period of from 30 minutes to 1 hour or more. The caramelized milk solids appear to enhance the antioxygenic effect on the coffee.

In any event, even where caramelized whey is employed, it is not desirable for the caramelized whey to be powdered and then mixed mechanically with the ground roasted coffee or with the whole roasted coffee beans. The caramelized dried whey is dispersed in water and then applied to the coffee and preferably the coffee may be subjected to complete dehydration in order to reduce the moisture content to under 20% and preferably under about 15%.

For example, whey may be concentrated under reduced pressure to about 30% total solids. The whey in concentrated form may then be heated to 245° F. for 30 minutes in order to produce a caramelization effect. The caramelized whey may then be further diluted to about 15% total solids and the diluted caramelized whey is highly desirable for use for application to roasted coffee in the roasting cylinder and immediately after the flame is extinguished, applying between about 35 pounds and 55 pounds of this aqueous dispersion of caramelized whey to about 500 pounds of roasted coffee.

Where the coffee is combined with aqueous whey or other milk solids which have first been thoroughly caramelized, it is not so important that the coffee and the caramelized milk solids be subjected to an elevated temperature treatment during subsequent drying. Under these circumstances, vacuum evaporation or low temperature drying may be utilized. Where, however, the milk solids have not been caramelized in their preparation, it is important that the application of the milk solids be made during the roasting of the coffee beans or while the coffee beans are at an elevated temperature, preferably over 250° F., or following the application of the milk solids thereto, the coffee is subjected to at least 200° F. to 210° F. and preferably to over 250° F. in order to produce the enhanced antioxygenic effect.

Where desired, the coffee immediately at the close of the roasting operation and while still in the roasting cylinder, may have applied to it a small proportion, such as about 3% to 7%, of water which will reduce the temperature of the coffee to about 250° F. and then the aqueous dispersion of milk solids may be applied to reduce the temperature of the coffee still further from 250° F. to approximately 200° F.

For example, 500 pounds of coffee beans may be roasted until they reach a satisfactory color. Immediately as the flame is extinguished in the roasting chamber, there may be applied to the coffee beans 20 pounds of water, substantially all of which is immediately converted to steam. Then, immediately following the application of the water to the coffee beans, there may be applied 30 pounds of an aqueous dispersion of skim milk, said dispersion containing 8 pounds of skim milk powder which has been dispersed in 22 pounds of water.

It has been found particularly desirable for the aqueous dispersion of milk solids to be adjusted to a pH of between about 4 and 6.9 and desirably to a pH of 5.5 to 6 before being applied to the coffee. The acidification of the milk solids may be made by the addition of an acid such as citric acid, tartaric acid, succinic acid, hydrochloric acid, acetic acid or phosphoric acid. This acidification has been found particularly desirable where the greatest degree of stabilization is desired.

If desired, it is also possible to obtain this stabilizing effect by extracting the coffee beans or the ground or powdered coffee with water or with water and alcohol mixtures, or with alcohol, to which aqueous or alcoholic dispersion during extraction, with or without concentration and removal of the water or alcohol, may be added concentrated or dried whey or other milk-solids-not-fat, preferably in caramelized form. Following this extraction and combination of the coffee extracts with the milk-solids-not-fat, such as with the whey, the combination is dried.

Where caramelized whey or caramelized milk-solids-not-fat are added to the coffee extract, the coffee extract containing the added milk solids may thereupon be dried under reduced pressure without additional heat.

Where, however, the whey or milk-solids-not-fat have not been caramelized after addition to the coffee extract or after extracting the coffee with the substantially diluted whey or other milk solids, the coffee containing the whey is subjected to an elevated temperature of at least 200° F. to 250° F. or more during or incidental to the drying of the coffee extract.

For example, 20 parts of coffee may be heated with 100 parts of water by weight, said water containing about 1 part of whey solids or milk solids, preferably in caramelized condition, at 200° F. for 10 minutes, preferably under reduced pressure, after which the aqueous dispersion of the milk solids containing the coffee extract is removed from the coffee insoluble portion by filtration and the aqueous extract is then evaporated under reduced pressure and preferably at a temperature not exceeding about 150° F., until the extract containing the milk solids has about 50% total solids. At this point, the extract may be drum dried or when still containing about 25% total solids, the extract may be spray dried in a heated chamber. In any even, the extract is reduced in moisture content to substantial dryness and until the extract contains less than 20% total moisture and preferably 10% or less. This procedure is less preferable to the procedures outlined above in which the whole coffee beans or ground coffee beans are treated with the milk solids and not subjected to extraction.

The coffee may, where desired, be subjected to a "puffing" operation either in ground unroasted condition or after roasting and either prior to or following the whey or other milk solids treatment.

For example, the coffee beans may be placed into a "puffing gun" which is heated to about 300° F. to 600° F. and into which steam is introduced so that the internal pressure reaches 40 pounds to 200 pounds or more per square inch. After a period of about 5 seconds to several minutes, the pressure may be released and the coffee beans discharged.

Together with or in lieu of th milk solids, and particularly whey, there may be employed the alcohol soluble extracts of these milk solids. For example, an extract of concentrated and preferably dried whey or other milk solids may be made by the use of methyl alcohol, ethyl alcohol, butyl alcohol or propyl alcohol in order to produce an alcohol soluble extract and which extract, after removal of the solvent therefrom, may readily be employed together with or in lieu of the whey or other milk solids in accordance with the present invention.

Brewer's yeast and baker's yeast and particularly the water soluble extracts of the yeast may also be applied to coffee in aqueous suspension or dispersion while the coffee beans are at the elevated temperature. The slightly acidified water soluble extract of yeast, when applied to the heated coffee beans, develops marked antioxygenic activity and assures better retention of the original flavor and aroma of the coffee after grinding and holding under normal room temperature conditions.

Unless the yeast or its water extract is applied to the coffee beans while they are at the elevated temperature, such as at over 250° F., the desired antioxygenic effect is not exerted.

Water extracts of brewer's yeast may also be used to produce an antioxygenic effect when applied to glyceride oils, and aqueous food compositions containing oils dispersed therein, such as dairy products, beverages, and confections, desirably when heated in the presence of the yeast or its extract.

Another product that may less preferably be extracted in accordance with this invention is the residue obtained from the fermentation of molasses in the production of alcohol. This residue from the molasses fermentation and particularly its water extract also develops marked antioxygenic activity when applied in aqueous dispersion to coffee beans when they are at the roasting temperature.

The present application is a continuation in part of application Serial No. 301,757, filed October 28, 1939 (now Patent 2,198,206); Serial No. 301,756, filed October 28, 1939 (now Patent 2,198,207); and Serial No. 317,175 (now Patent 2,198,218).

Having described my invention, what I claim is:

1. A process of producing a stabilized roasted coffee product which comprises applying to the roasted coffee immediately following roasting and while the coffee beans are at a temperature in excess of 250° F. a small amount of caramelized milk-solids-not-fat in aqueous dispersion, whereby the coffee is substantially stabilized against staleness.

2. A process of producing a stabilized roasted coffee product which comprises treating said coffee with a relatively small proportion of caramelized milk-solids-not-fat in aqueous dispersion and then reducing the coffee to substantially dry condition whereby the coffee is substantially stabilized against staleness.

3. A process of producing a stabilized roasted coffee product which comprises coating roasted coffee with a relatively small amount of caramelized milk-solids-not-fat at a temperature of at least 200° F., whereby the coffee is substantially stabilized against staleness.

4. A stabilized roasted coffee product stabilized against oxidative deterioration, said coffee product consisting of roasted coffee carrying and being stabilized by a heat reacted coating composed of caramelized milk-solids-not-fat.

5. A stabilized roasted coffee product stabilized against oxidative deterioration, said coffee product consisting of roasted coffee carrying and being stabilized by a heat reacted coating composed of caramelized whey.

SIDNEY MUSHER.